United States Patent [19]

Sheldon

[11] 4,204,118

[45] May 20, 1980

[54] APPARATUS FOR PRODUCING X-RAY IMAGES BY ELECTRICAL CHARGES

[76] Inventor: Edward E. Sheldon, 30 E. 40 St., New York, N.Y. 10016

[21] Appl. No.: 803,130

[22] Filed: Jun. 3, 1977

[51] Int. Cl.$^2$ ........................ G01D 9/00; G03G 13/00; G03G 15/00; H01J 31/50

[52] U.S. Cl. .......................... 250/315.2; 250/213 VT; 346/158

[58] Field of Search ........ 250/213 VT, 315 A, 315 R; 346/158

[56] References Cited

U.S. PATENT DOCUMENTS

| | | | |
|---|---|---|---|
| 3,100,845 | 8/1963 | Sclar | 250/213 VT |
| 3,164,837 | 1/1965 | McNaney | 346/158 |
| 3,277,237 | 10/1966 | Wolfgang | 346/158 |

*Primary Examiner*—Alfred E. Smith
*Assistant Examiner*—T. N. Grigsby

[57] ABSTRACT

This invention relates to novel electronic devices for producing images such as of X-rays by means of electrical charges. The image the examined body or object is converted in a novel vacuum tube into a beam of electrons having the pattern of radiation image. This beam of electrons is converted next into electrical conductivity changes pattern which in turn modulates uniform electrical charges to produce the final image corresponding to original radiation image.

In one embodiment of this invention the novel vacuum tube is provided with an image producing screen which exhibits electrical conductivity changes when bombarded by electrons.

In one embodiment of this invention, two image producing screens are used, one of which is stationary and is affixed to wall of said vacuum tube and another one which is traveling outside of said tube. The stationary screen comprises layer of material exhibiting electrical conductivity changes when irradiated by said beam of electrons. The traveling film comprises a film of dielectric material which is inert to light which means is not light sensitive.

In one embodiment of this invention the light inert traveling film is traveling within said tube and after the exposure to the outside of said tube.

Means are also provided for advancing the traveling image producing screen to said vacuum tube and transporting it away from said tube to the means for developing and fixing said image of electrical charges.

This invention will be especially useful for intensification of images formed by invisible radiations.

9 Claims, 15 Drawing Figures

FIG. 1
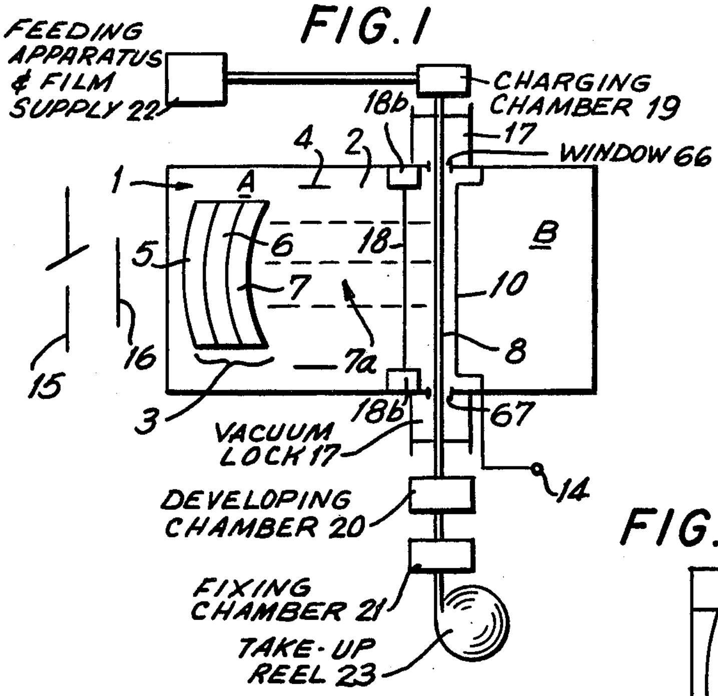
FIG. 1a
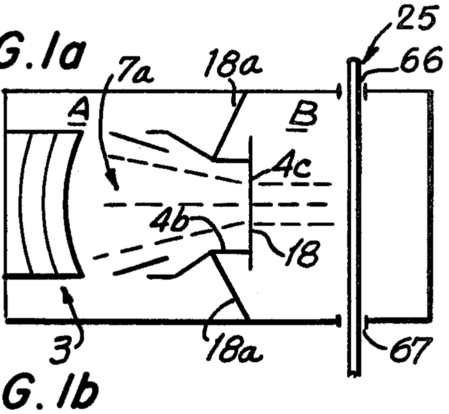
FIG. 1b
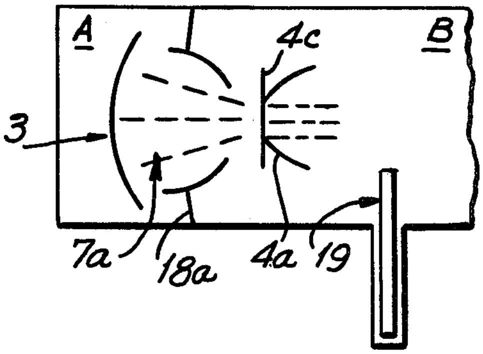
FIG. 2
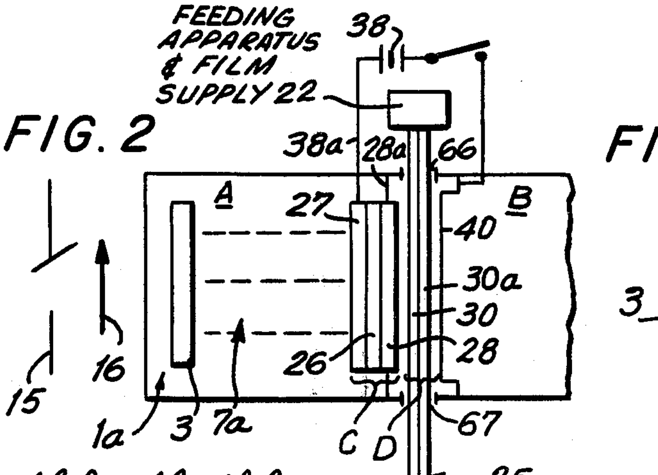
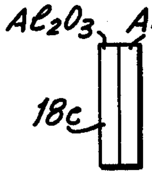
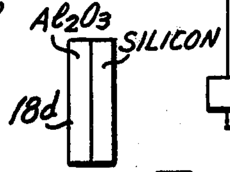
FIG. 1c FIG. 1d
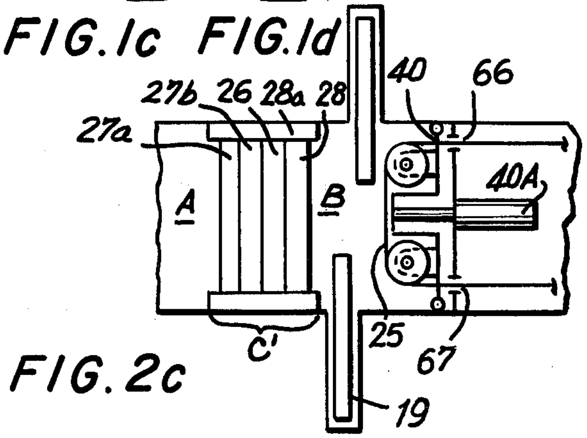
FIG. 2c FIG.4
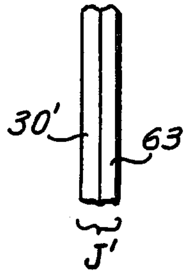
FIG.5
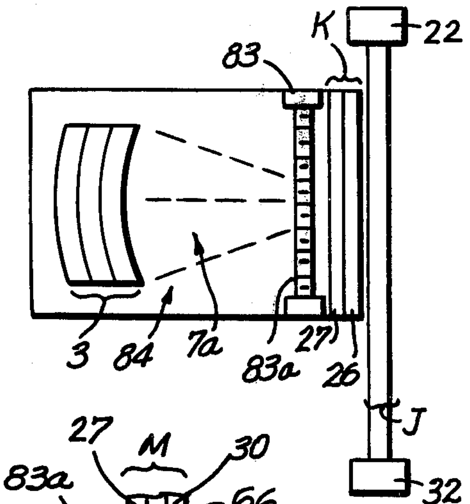
FIG.5a
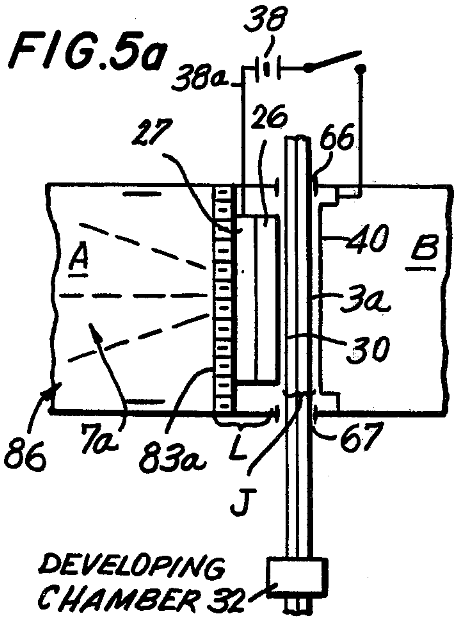
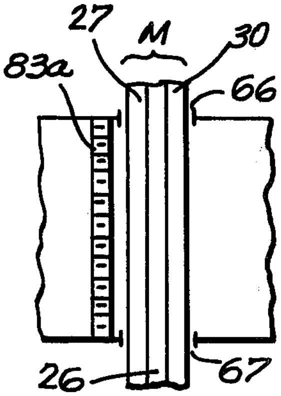
FIG. 5b

APPARATUS FOR PRODUCING X-RAY IMAGES BY ELECTRICAL CHARGES

This invention relates to a novel system of electrophotography which means an apparatus for producing pictures formed by electro-magnetic radiations, such as X-rays, Gamma rays, infrared rays or by atomic particles beams such as electrons or neutrons.

The present systems are based on the use of films made with silver halides and which are used in combination with X-ray sensitive fluorescent screens. The present radiographic systems do not provide any means for intensification of the X-ray image and as a result a large amount of X-radiation is necessary to produce a radiograph. This may be not of crucial importance in industrial radiography, but is of great importance in the medical radiography in which the X-ray exposure of patients should be kept at minimum. In view of the fact that the number of X-ray examinations increases greatly every year, the concern is voiced that many patients, especially of reproductive age receive too large amount of X-radiation which may affect their genetic system. This means that the number of congenital malformations in newborn may increase greatly. It is therefore of great importance to provide a system of radiography which will reduce the X-ray exposure of patients and still will provide the necessary diagnostic information. This is the main objective of the present invention.

Another objective of this invention is to produce X-ray images, and images formed by other electromagnetic radiations and by atomatic particles beams, of better diagnostic quality than it was possible using the present methods.

The above objectives were realized by the novel system of electroradiography which is characterized by the use of electronic amplification of images in a novel vacuum tube, of inexpensie materials such as plastics for reproducing images in a visible form as electroradiographs, and a system of continuous feeding said image reproducing film or tape into said vacuum tube for exposure and transporting said film to the outside of said tube for inspection of the image. It was found, however, that this system produced impairment of the vacuum of the novel vacuum tube and resulted into an early decay of the photocathode or of the electron gun mounted in said tube. This problem was solved by the use of a continuous very thin membrane mounted in the path of the electron beam *7a* which is emitted by the photocathode 3 or its modifications and which beam carries the image of the examined object or body.

The invention will be better understood when taken together with the accompanying drawings.

In the drawings:

FIG. 1 shows the new apparatus for electroradiography which comprises an X-ray or gamma rays sensitive vacuum tube, comprising dielectric film traveling through said tube and a separating membrane.

FIG. 1*a* shows modification of electron beam transmitting membrane or screen.

FIG. 1*b* shows modification of vacuum tube which is provided with a shutter.

FIG. 1*c* shows modification of electron beam transmitting membrane.

FIG. 1*d* shows modification of electron beam transmitting membrane.

FIG. 2 shows modification of the apparatus for electrophotography in which the novel vacuum tube contains stationary screen comprising a layer of material which exhibits electron bombardment induced conductivity, said layer stationary in said tube.

Figure 2A:
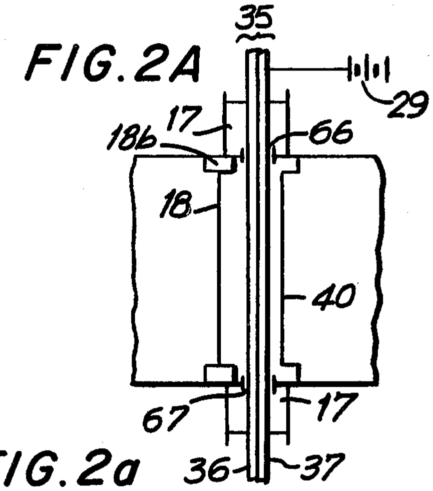
FIG. 2A shows modification used in the embodiment of FIG. 2 in which said layer is traveling through said tube.

FIG. 2*a* shows modification of embodiment of FIG. 2 in which the traveling image producing screen consists of a single layer.

Figure 2B:
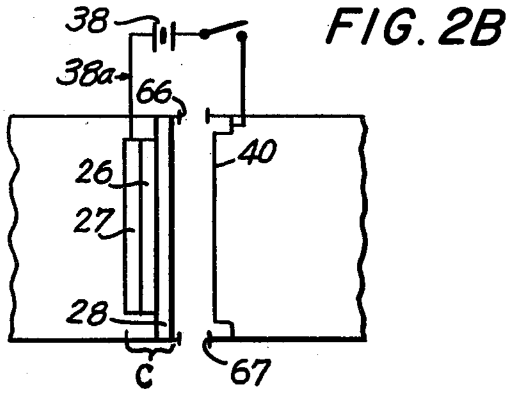
FIG. 2B shows modification in which Corona charging is used.
Figure 2A:
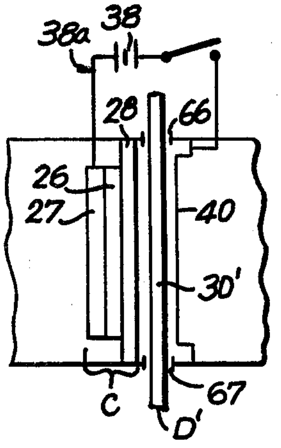
Figure 2B:
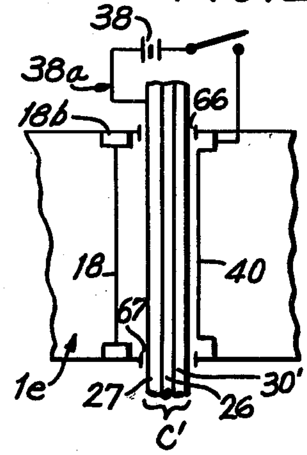

FIG. 2*b* shows modification in which one composite image producing screen is used and which is traveling across said tube.

FIG. 2*c* shows modification of invention shown in FIG. 2.

FIG. 4 shows modification of the second image producing screen.

FIG. 5 shows modification of the invention in which the first image producing screen is disposed on an array of electrically conducting conduits mounted in the endwall of vacuum tube.

FIG. 5*a* shows embodiment in which the first image producing screen is mounted on supporting member comprising plurality of electrically conducting conduits.

FIG. 5*b* shows modification in which a single composite imaging film, which is traveling, is used.

FIG. 1 shows the X-ray or gamma ray or neutrons source 15, the examined object 16 and the novel X-ray or gamma rays or neutrons sensitive image tube 1 which comprises an evacuated envelope 2. The X-ray or gamma rays or neutrons sensitive photocathode or screen 3 may be mounted on the inside surface of the endwall of said tube or it may be mounted in a spaced apart relationship from said endwall. In the latter case it will be supported by the supporting member 5 such as of aluminum or beryllium. The photocathode 3 comprises furthermore fluorescent layer 6 of one of phosphors such as of CsI or ZnSCdS or $CaWO_4$ or of mixture thereof and photoemissive layer 7 such as of CsSb or K-Cs-Sb, Na-K-Sb or other photoelectric materials of multi-alkali type. The X-ray image is converted in said photocathode 3 into a fluorescent image and next into a beam of free photoelectrons *7a* corresponding to the X-ray image. The beam of photoelectrons *7a* is accelerated to the necessary velocity by electrostatic electrodes and then is focused by electrostatic or magnetic focusing electrode means 4 onto electron reactive dielectric film 8. The focusing means 4 may also be of demagnifying type which will reduce the size of electron beam *7a* by factor of 2 to 10 according to the size of the tube 1 and resolution of image desired. The demagnifying focusing means *4a* may be in the form of electrostatic cylinders or rings of progressively decreasing diameter or may be in the form of two spherical cones *4b* and *4c* as it is well known in the Art. The accelerating electrodes may increase the velocity of the electron beam *7a* to 12–30 KV or higher according to the application. In some cases the focusing electrodes may be omitted and photoelectron or electron beam may be focused onto the film 8 by proximity focusing. In such case the spacing between the photocathode 3 and film 8 should not exceed 5 mm and the photocathode 3 will have a planar shape. The electron reactive film 8 may be one of flexible or semi-flexible plastics of a high electrical resistivity such as polyesters, polyamides, polyethylenes or polycarbonates. Preferably a transparent material should be used, but this is not obligatory.

In the embodiment of invention which uses electrostatic focusing means the film 8 or its modifications described below may have a curvature with the concavity facing the concavity of the photo-emissive layer or it may be also of planar shape. In the embodiment in which magnetic focusing means are used and also in modification in which the proximity focusing is used the film 8 will have planar shape parallel to the planar shape of the photoemissive layer.

The dielectric film 8, in some applications receives in a charging chamber 19 before its introduction into the X-ray sensitive vacuum tube 1 an electrostatic uniform charge of positive sign on its surface which will face the photocathode 3. The dielectric film 8 positively precharged will be now introduced into vacuum tube 1 through the window 66 protected by vacuum locks 17 and will be bombarded by the electron beam 7*a*. In this modification the velocity of photo-electron beam must be such that it produces secondary electron emission of less than unity and forms thereby a negative charge image on film 8. This negative charge image is immediately neutralized by the positive electrostatic charge which was deposited on film 8 previously. As a result, the remaining positive charge on film 8 will have the pattern of the original photo-electron beam and therefore of the original X-ray image. The film 8 is now transported out of the vacuum tube 1 through window 67 protected by vacuum locks 17 and travels into developing chamber 20 which may have various forms well known in the Art and which may use a toner for said development. The film 8 with the developed image is transported now into transfer and fixation chamber 21 to produce the permanent image. If the transfer of image onto another material is desired, it can be done by well known transfer techniques. The final image may be therefore in the form of transparency and can be examined with transmitted light like any conventional X-ray film, or it may be in non-transparent form in which case it will be examined with reflected light.

The apparatus 22 for feeding and transporting the film 8 or its modifications into the vacuum tube 1 through window 66 and apparatus 23 transporting said film 8 to the outside of said vacuum tube are of standard type.

It was found that the continuous introduction of the film 8 or modifications described below into vacuum tube 1 caused deterioration of the vacuum of said tube and leads to premature inactivation of the photo-emissive layer 7. This necessitates replacement of the photocathode 3 or in many cases of the entire vacuum tube. The solution of this problem was found in the construction of the vacuum tube 1 in which a very thin membrane 18 was mounted in the path of the electron beam 7*a*. The membrane 18 may also be called a screen, is continuous, which means imperforate, and is mounted on a support 18*b* so that this support together with said membrane occlude the lumen of the vacuum tube 1 and create thereby two separate vacuum compartments, namely compartment A in which photocathode 3 or its modifications is located and vacuum Compartment B in which image producing means such as film 8 or 25 or 55 and their modifications are located. The membrane 18 may be of dielectric material such as aluminum oxide or silicon oxide or dioxide or it may be of an electrically conducting layer such as silicon or aluminum which in some cases may be mounted on the supporting layer of dielectric material such as described above. This is illustrated in FIG. 1*c* and 1*d*. The main characteristic of the membrane 18 and its modifications is that it is transmitting electrons of velocity higher than 12 KV and is not transmitting to ions, of velocity up to 30 KV. The thickness of membrane 18 and its modifications will depend on the velocity of the electron beam 7*a*. It should be understood that membrane 18 and its modifications may be mounted in various positions. One preferred position for the membrane 18 to be mounted is on the aperture 4*c* of demagnifying electrode 4*a* or 4*b* or in its vicinity as shown in FIG. 1*a* and 1*b*. In such case, additional mechanical members such as baffles or flanges 18*a* must be provided to effect the complete closing of vacuum compartment A and its separation from compartment B.

The membrane 18 and its modifications may also be placed after the aperture 4*c* of the electrode and will be then supported by supporting means 18*b*, which may be attached to walls of the tube 1 as shown in FIG. 1 or to walls of electrodes 4 or 4*a* or 4*b*. It should be understood that membrane 18 or its modifications may also be mounted within electrodes 4 or electrodes of demagnifying type 4*a* or 4*b*, which means before or after the aperture 4*c*.

The complete separation of vacuum compartment A from vacuum compartment B will insure that the impairment of vacuum in the compartment B by continuous introduction of the film 8 or film 25 or 35 or 55 will have no effect on the compartment A and on the photoemissive 7 layer anymore.

It should be understood the use of membrane 18 and its modifications applies also to all vacuum tubes provided with electrodes of magnetic or electro-magnetic type.

It was found that membrane 18 being very thin was easily ruptured if the pressure in compartment B fluctuated widely. Such changes of pressure may be reduced to a minimum compatible with the integrity of membrane 18 by an efficient system of vacuum locks 17. It was found, however, that in some cases it is necessary to provide a further protection and this was obtained by the use of shutter 19 which is shown in FIG. 1*b*.

The shutter 19 is closed when the film 8 or 25 or 35 or modifications enters into compartment B and it opens synchronously with the X-ray exposure or gamma rays or other electromagnetic radiations, such as infrared, and it also applies to the exposure by a beam of atomic particles, such as electrons or neutrons. The shutter 19 closes after each exposure. Therefore, the fluctuation of pressure in compartment B due to opening of vacuum locks 17 will have not effect on membrane 18 and its modifications.

It was also found unexpectedly that the use of closing membrane 18 and its modifications reduced the background dark current of vacuum compartment A. This is of a great importance in applications in which the imaging signals input is so weak that it approaches the level of the background noise of compartment A. In such cases the use of closing membrane 18 and its modifications was found to increase considerably the signal to noise ratio of this device and will provide useful images which would be otherwise lost in the noise of the tube. This is of great importance for construction of Gamma Cameras.

It should also be understood that this invention is applicable and useful for vacuum tubes which are responsive to infrared. In such cases the photocathode 3 may be modified to eliminate the fluorescent layer 6 and the supporting layer of aluminum, and the photo-emissive layer 7 may be of caesium oxide or of photo-emissive materials which have negative electron affinity such as gallium arsenide or silicon of p type or n type conductivity.

It was found, however, that in some applications such as in medical radiography where the imaging X-radiation has to be very low in order not to harm patients, the above described devices do not have the sensitivity which is necessary. It was found that in examinations of heavy parts of patients, such as abdomen, it is necessary to improve the sensitivity by a factor of 100–200. In order to obtain such improvement, it is necessary to increase the current density of the photo-electron beam without increasing the amount of X-radiation. This was accomplished by using cascade intensification in which another composite screen made of a light reflecting layer, a fluorescent layer, a light transporting member and of a photo-emissive layer in that order is mounted in spaced relation to the photocathode 3. The photo-electron beam from photocathode 3 is accelerated to 15–20 KV before it impinges on the second composite screen, producing thereby intensification of photo-electron beam by a factor of 50–100 as it was described in my U.S. Pat. No. 2,555,423. It may be added that the supporting light transparent layer for the second composite screen may be of vacuum and heat resistant plastic material, such as polyamide or silicones, glass, mica or fiberoptic plate in order to be able to make this second composite screen of size necessary in medical radiography. In some cases, the fluorescent layer may be mixed with a light transparent separating layer to make a self-supporting member of this mixture.

Another way to amplify the photo-electron beam is to use a multi-channel electron multiplier as described in my U.S. Pat. No. 3,400,291.

Another way to amplify the photo-electron beam is by the use of an electron multiplier of transmission type, such as a membrane of silicon preferably of p-type.

All these amplifying means will increase the sensitivity of this apparatus for radiography by a factor of 100–200. The above described amplification allows to use the very low sensitivity dielectric film 8 without increasing the amount of X-radiation and such combination represents an important feature of this invention.

In all embodiments of the invention, it is advantageous for better sensitivity to demagnify the photo-electron beam electron-optically. This is also of great importance as it permits to reduce the size of the amplifying stage which will allow to make the apparatus of a smaller size and of a lower cost.

It was found that many desirable materials for the layer 26 which produces electrical conductivity changes in response to electron bombardment, could not be used because conductivity changes were of short duration only. This problem was solved by novel construction shown in FIG. 2. In this embodiment vacuum tube 1*a* is provided with a stationary composite screen C which comprises electrically conducting layer 27 such as of aluminum, gold, tungsten or palladium and which is very thin so that it is transmitting for electron beam 7*a*. Next to layer 27 is layer 26 of material exhibiting induced conductivity by electron bombardment such as of MgO, alkali halides, such as KCl; ZnS or CdS or $Sb_2S_3$, with or without activators such as tellurium or arsenic. Next to layer 26 is layer 28 which is the supporting member for screen C and is of dielectric materials such as glass, fiberoptic plate, plastics which are heat resistant, such as polyesters, polycarbonates, silicones, polyamides, polyethylenes or of $Al_2O_3$ or of silicon oxide. The layer 28 in some applications must extend to sidewalls of the vacuum tubes 1*a* and be affixed or fused to said sidewalls. This construction of layer 28 will permit in some applications to eliminate membrane 18 because the function of membrane 18 will be now provided by the layer 28 which occludes lumen of vacuum tube 1*a* and divides said tube into 2 vacuum compartments A and B completely separated from each other which means non-communicating with each other. In some cases, layer 28 may terminate before reaching sidewalls of vacuum tubes 1*a*. In such case, additional supports or guards 28*a* are connected to sidewalls to support layer 28 and produce thereby the complete division of vacuum tube 1*a* into 2 separate compartments A and B. The layer 28 may be also interposed between layer 26 and 27.

In some cases, layer 26 such as one of the materials described above may be made as a mixture with binder resin and may be self-supporting or it may still require for support a layer of materials such as described for layer 28 described above. This will permit to make the layer 28 to be much thinner which is important to improve definition of images produced by this device, and sensitivity of this device.

Next to screen C, which is stationary is mounted traveling screen D. Screen D comprises thin flexible dielectric inert to light, which means not responsive to light, layer or film 30 of materials such as described above for layer 28. Layer 30 is mounted on electrically conducting flexible supporting base 30*a* of metal or metal laminate such as copper laminate or aluminum laminate. Screen D may be backed up by support member 40 and be in contact with it. Screen D is brought into vacuum tube 1*a* from the outside through window 66 and must be mounted in very close proximity or preferably in contact with screen C to obtain the best definition of images to be produced and the best sensitivity. In order to insure such good contact electrically conducting support member 40 or base 30*a* of screen D and electrically conducting layer 27 of screen C are connected to a source of electrical potential 38. When the circuit 38*a* is closed, it produces a voltage of about 1000 volts and screen C and D will be then attracted to eachother by electro-static forces to form a good contact. In some applications this step may be omitted, and the good contact may be established by mechanical means.

The image of radiation such as X-rays or gamma rays and others, is converted by photocathode 3 or its modifications into a beam of electrons 7*a* which has the pattern of the original image. The electron beam 7*a* is accelerated to high potential such as 10–20 KV and impinges on layer 26 and produces therein electrical conductivity changes corresponding to the pattern of said electron beam. The necessary high voltage for acceleration of electron beam 7*a* may be provided by the source 38 or by another source which is connected either to layer 27 or to supporting member 40.

In one mode of operation of this device, simultaneously with the imaging exposure, circuit 38*a* is closed and a discharge is produced between screen C and D. The resulting electrical charges at the interface of screens C and D leak away by induced electrical conductivity changes in layer 26 and the remaining charges will have latent pattern corresponding to electron beam

*7a* image. The same electrical charges pattern is present, therefore on the surface of dielectrical imaging layer 30.

Next screen D is detached from the contact with screen C and is moved out of vacuum tube 1*a* by take-up reel 23 through window 67 and proceeds now to developing chamber 32 and then to fixing chamber 33, as was explained above.

It should be understood that electron beam image *7a* may be intensified on its way to image receiving screen C by various means described above. In particular, one preferred means of such intensification is electron-optical demagnification of said electron beam *7a* which results in its intensification proportional to the square of linear demagnification.

In this way, radiograph may be produced on an inexpensive plastic film or tape and with only a small amount of X-radiation, both of which are the objectives of this invention.

In another modification of this invention shown in FIG. 2*a* screen D' consists only of dielectric layer or film 30' of materials described above for film 30, and which is supported by electrically conducting member 40 and is in contact with said member. In this embodiment of invention, dielectric film 30' must be self-supporting in order to be able to be detached from said member 40 and travel outside of the vacuum tube. It must have, therefore, a greater thickness than film 30.

It should be understood that in embodiments of the invention shown in FIG. 2 and FIG. 2*a*, screen C may receive electrical charge on the uncovered surface of dielectric layer 28 prior to the time of X-ray exposure which may be called precharging said screen. In some cases, the supporting base 40 may be omitted or may be made to be retractable in order to facilitate Corona charging of the layer 28, either before imaging exposure or simultaneously as shown in FIG. 2B. In some cases, application of voltage spark from circuit 38*a* described above may be omitted or it may be used in combination with precharging of the layer 28.

It is preferable to precharge layer 30 or 30' prior to introduction into vacuum tube 1*a*. In some cases, dielectric layer or film 30' will receive electrical charges such as Corona discharge deposition simultaneously with the imaging exposure either in addition to the precharging of said layer 30' or instead of precharging said layer 30'.

It should be understood that in many applications, membrane 18 and its modifications described herein should be used together with screen C to insure a better protection of vacuum in compartment A, because the closing of circuit 38*a* may cause escape of electrons from electrically conducting layer 27. In addition, high voltage field present between layer 27 and photocathode 3 may produce field emission of electrons into compartment A.

Another embodiment of this invention is shown in FIG. 2*b*. In this embodiment vacuum tube 1*e* is provided with image producing traveling screen C' which comprises electrically conducting layer 27, layer of material exhibiting electron bombardment induced conductivity 26 and dielectric film 30' which is supporting screen C'. Film 30' may be of materials described above for the film 30. Electrically conducting support member 40 is provided for support of screen C'. The member 40 and layer 27 are connected to a source of electrical potential and form together electrical circuit 38*a* as was explained above.

The film 30' receives electrical charges either by depositing by Corona discharge such charges on its uncovered surface prior to X-ray or other radiation exposure or by application of voltage spark from source 38 by closing circuit 38*a* prior to X-ray exposure or simultaneously with X-ray exposure. This will produce electrical charges at the interface between layer 26 and film 30' which are in contact with each other. Because of capacitative coupling similar charges will appear on free surface of film 30'. Electrical charges at said interface and electrical charges on the uncovered surface of film 30' will leak away according to the pattern of electrical conductivity changes in layer 26 and will leave, therefore, the pattern of electrical charges on surface of film 30' corresponding to the original image. After the X-ray or other radiation exposure, the whole screen C' is removed from vacuum tube 1*e* through window 67 and is directed to developing chamber 32, where the latent image on surface of layer 30' may be transferred to another dielectric film for developing and fixing. The screen C' can be then reused for new imaging exposure.

The embodiment of the invention shown in FIG. 2*b* may be modified by removing support member 40 or by making it of dielectric material. In this embodiment, the uncovered surface of film 30' is precharged by Corona discharge. The voltage spark is not applied in this construction.

FIG. 2A shows another embodiment of the film 25 in which only 2 layers are present. The film 35 consists of layer 36 which is of dielectric material such as MgO, alkali halides, ZnS or CdS or $Sb_2S_3$ with activators such as tellurium or arsenic, and exhibits electron bombardment induced conductivity. Next is the layer 37 which is of flexible and electrically conducting material, such as copper laminate or other metal laminate and which is made thick enough to be self-supporting. The layer 37 is connected to the source of electrical potential 29 or to ground. The planar or curved member 40 may be used to provide support for the film 25 or 35. It may also serve to provide the necessary curvature for the film 25 or 35 in some cases. It may be also connected to the source of electrical potential to provide high acceleration for the electron beam, such as 10–20 KV, which is necessary to produce electrical conductivity by electron bombardment. The member 40 may be conversely connected to the ground, if the photocathode is held at high negative potential.

In some applications the film 25 or 35 may be precharged with a uniform electrostatic charge before introducing said film into vacuum tube 1 or its modifications. In such case, the subsequent deposition of electrical charge after removal of film 25 or 35 from vacuum tube may be omitted. This embodiment of the invention is of importance if the materials used for film 25 or 35 exhibit induced electrical conductivity for a short time only. The electron bombardment induced conductivity can produce amplification of the electron beam by the factor of 100 to 1000 and allows therefore to eliminate other amplification means described above, in some applications. In other cases, however, there may be need for additional amplification of the electron beam and in such cases the use may be made of all amplifying devices which were described above. In particular, it should be understood that in all devices described above the use may be made of amplification of the electron beam either by means of another stage composite screen, or of a multi-channel electron multiplier or of transmission type of electron multiplier such as silicon membrane of p-type. It should be understood that in all devices described above, the focusing means for electron beam may be of electrostatic type or of magnetic type or of proximity focusing type.

It should be understood that in all embodiments of invention, the final radiographic image may be made on a transparent substrate or on light reflecting substrate. It should be understood that in all embodiments of invention, the final radiograph may be made of either polarity which means that black and white areas of radiograph may be reversed according to the need of application. It should be understood that in all embodiments of invention, the final radiograph may be produced on the original film which was used in a vacuum tube 1 or its modifications or may be produced on another film which serves as a transfer medium.

In conclusion, an efficient and inexpensive new system of electroradiography is provided by the apparatus described in FIGS. 2 and 2A and their modifications, which will provide at the same time better X-ray examinations and at a much lower cost.

Another modification of this invention is shown in FIG. 5. In this embodiment of the invention, electron 7a which has the pattern of original image impinges on the first image reproducing screen K which comprises very thin electrically conducting layer 27 transmitting said electron beam 7a and layer 26 which exhibits electrical conductivity changes having the pattern of said electron beam when impinged by said electron beam as was described above. The layer 27 and 26 are mounted on the outside surface of endwall 83 of vacuum tube 84. The endwall 83 has an insert 83a which comprises a two-dimensional array of electrically conducting channels or plugs of small diameter such as between 3 microns and 100 microns, and which are electrically insulated from each other. Such array may be constructed by using micro-channel plates such as described in U.S. Pat. No. of Manley 3,260,876 and by filling their hollow channcels with molten electrically conducting material such as aluminum or copper which upon cooling will solidify and produce very thin electrically conducting plugs or conduits extending throughout the thickness of said micro-channel plate from one surface to the opposite surface thereof and insulated from each other. Electron beam 7a is accelerated to high velocity by potential of 10–20 KV, is transmitted by insert 82a and impinges on layer 26 and produces varying pattern of electrical conductivity changes corresponding to the original image as was explained above. In some applications layer 27 may be omitted and layer 26 will be in contact with the outside surface of the electrically conducting insert 83a.

Electrical charges deposited on the surface of dielectric image producing layer 30 or 30' of the second imaging screen J or J' are also present on the surface of layer 26. These charges will at the time of imaging exposure leak through layer 26 because of electron bombardment induced conductivity to conducting layer 27. As a result, pattern of electrical charges will be formed on the surface of layer 30 or 30' adjacent to the layer 26 which means in contact with said layer 26 or in a close proximity to it, which pattern corresponds to the original image. After the imaging exposure screen J or J' or its modifications is detached from the vacuum tube 84 by using retraction from its contact with layer 26. It is very important to produce retraction of the screen J or its modifications which will avoid rolling or sliding of film 30 or 30' over the surface of layer 26 because it was found that it would damage the latent image present on said film. The retraction of screen J or its modifications may be achieved by any mechanical means which will pull the screen away from the tube 84. After retraction, film 30 or 30' is directed to developing chamber 32 as was explained before. Instead of screen J or J' also screen 8 maybe used.

It should be understood that the application of voltage spark to the first screen K and to second image producing screen J or its modifications such as screen J' shown in FIG. 4e may be provided from the source of electrical power such as 29 or 38 which is connected to layer 27 and to electrically conducting layer 30a of screen J or its modifications such as screen J' as was explained above.

Another modification of the invention shown in FIG. 5 above is illustrated in FIG. 5a. In this embodiment of the invention, the first image producing screen L comprises electrically conducting insert 83a mounted within vacuum tube 86, very thin electrically conducting layer 27 which is mounted on the surface of said insert 83a and layer 26 of material exhibiting electron bombardment induced conductivity which is in contact with layer 27; all said parts were described above. The electrically conducting insert 83a serves as supporting member and also as protecting member separating tube 86 into two separate vacuum compartments A and B. The insert 83a in tube 86 may be much thinner than in tube 84 in which it formed endwall of said tube. This is of great importance to reduce or to prevent electrical cross-talk between adjacent conducting plugs which is a problem in spite of dielectric insulation between all adjacent plugs. Adjacent to the surface of layer 26 is disposed the second imaging producing screen such as 8 or J or J' shown in FIG. 4e or its modifications, described above. The contact between the layer 26 and the second image producing screen is obtained by mechanical means or by electrostatic attraction as was described above. The uncovered surface of layer 26 or of layer 30 or 30' may be precharged by deposition of electrical charges thereon before bringing screen J or J' or its modifications in contact with layer 26. The image of radiation is converted in the photocathode 3 or its modifications into electron beam 7a which has the pattern of said image. Electron beam 7a is accelerated to high velocity by potential of 10–20 KV, is transmitted through the insert 83a and impinges on layer 26 and produces thereon pattern of electrical conductivity changes corresponding to the original image as was explained above. Electrical charges which were deposited on the surface of dielectric image producing layer 30 or 30' of screen J or J' or its modifications are also present on the surface of layer 26. These charges will at the time of imaging exposure leak through layer 26 because of electron bombardment induced conductivity to conducting layer 27. As a result, pattern which means image of electrical charges will be formed on the surface of layer 30 or 30' which is in contact with layer 26 and this pattern or image corresponds to the original image. In some cases the layer 27 may be omitted.

It should be understood that the application of voltage spark to the first screen L and to the second image producing screen J or J' or its modifications may be provided from the source of electrical power such as 29 or 38 which is connected to layer 27 and to electrically conducting layer of screen J or its modifications, as was explained above.

After the imaging exposure, screen J or J' or its modifications is detached from the layer 26 and is directed to developing chamber 32 as was described above.

If screen J was in contact with the layer 26, it is very important to produce retraction of the screen J or its modifications which will avoid rolling or sliding of film 30 or 30' over the surface of layer 26 because it was found that it would damage the latent image present on said film.

A modification of the invention shown in FIG. 5a is illustrated in FIG. 5b. In this embodiment, one composite screen M which comprises electrically conducting layer 27, layer 26 exhibiting electrical conductivity changes when impinged by high velocity electron beam and dielectric film such as 30 or 30' or their modifications may be used. All the above layers are in good contact with each other. This composite imaging screen is disposed at the surface of the conducting insert 83a so that layer 27 is in proximity or in contact with said insert 83. The insert 83a serves here as a protective membrane for photocathode 3 or its modifications because it divides effectively vacuum tube into 2 separate vacuum compartments A and B, which means that these compartments do not communicate with each other. The film 30 or 30' is precharged prior to the imaging exposure. After the exposure, the screen M is released from the contact with insert 83a and is directed to developing chamber 32 or its modifications for transfer of latent image of electrical charges from film 30 or 30' to another dielectric member.

The embodiment of FIG. 5b may be modified by mounting the insert 83a to be spaced apart from the imaging screen M. This is possible because insert 83a transmits electron beam 7a without scattering electrons and therefore transmitted electron beam 7a may be well focused either by electron-optical means or by proximity focusing.

In some cases, this composite screen will receive voltage spark either before or during imaging exposure as was explained above. The electrical source of power 38 may be connected to layer 27 and to an electrically conducting support member which may be used also to provide flat surface for this screen M to rest upon. Alternatively, the support 87 may be omitted and electrical source 38 will be then connected to film 30' which is modified by providing electrically conducting layer on its surface such as of aluminum or copper.

In the embodiment shown in FIG. 2 or in FIG. 2c, the supporting layer 28 must be of dielectric material and it can be mounted on supporting member 18b or on a ring 28a of titanium or other material which has similar heat coefficient of expansion and which in turn is affixed which means sealed or connected to one or both sidewalls of vacuum tube. Alternatively, sidewalls of the tube may have glass extensions of sidewalls projecting into lumen of vacuum tube to which the layer 28 may be connected or fused.

The protective function of the first image producing screen C for the photocathode may be enhanced by making layer 27 of greater thickness but compatible with good transmission electron beam 7a and by extending said layer 27 to sidewalls of the tube to occlude its lumen. This can be done in the same ways as was described above for connection of layer 28 with sidewalls of tube. The layer 27 may be also modified by making it composite of two layers namely dielectric layer 27a such as of aluminum oxide or silicon oxide and of electrically conducting layer 27b such as of aluminum or silicon which is in contact with layer 26. This embodiment of the invention is shown in FIG. 2c in which composite imaging screen C' is provided with layer 27a of materials described above or of evaporated glass or of heat resistant plastics and with layer 27b such as of aluminum or other electrically conducting material. Both layers 27a and 27b must be well transmitting for electron beam 7a and their combined thickness must not exceed 6 microns. In this modification, layer 28 may be reduced in thickness and may still be cooperative in supporting screen C' or may be made so thin that it will not serve anymore as supporting member, this function being rendered now by layer 27a or 27b or both of them. This construction has also a great advantage that it permits the use of high accelerating voltage because the danger of peeling off of the layer 27 or 27a or 48 is eliminated. If layer 27a is very thin, it may develop leaks and it is advantageous therefore, to deposit on its one or both major surfaces a thin layer of evaporated glass or of heat resistant plastics such as silicones or polyamides.

The boundary between the protecting layer such as 28 or 27a or 27b and its supporting member or connecting member to the sidewall of vacuum tube is the main region of leaks for ions and slow electrons which destroy photocathode. This boundary should be preferably fortified by evaporating glass or heat resistant plastic or silicon oxide thereon.

The image producing means will be light non-sensitive and may be of the type described herein such as 25 or their modifications. The image producing means travel from the outside of the vacuum tube 1a into compartment B of said tube and after the exposure travel to the outside of the tube 1a for processing, as was explained above.

As was explained above, focusing and demagnifying electrodes may be of magnetic or electromagnetic type in all embodiments of the invention. The great weight of said electrodes is not a problem when the novel apparatus is used for electroradiography because it may be located under or behind the examining table and be stationary in all examinations. In this embodiment, magnetic or electromagnetic electrodes of demagnifying type focus the electron beam 7a on the membrane 18 or its modifications and electrostatic electrodes 4 provide acceleration of said beam. The membrane 18 must be mounted on its support 18b and the size of the membrane 18 has to be larger than the size of demagnified electron beam 7a. Magnetic focusing is capable of producing images of high resolution. It requires, however, for a high resolution, a very flat surface of image producing means. This flatness can be insured by a supporting member such as 40, shown in FIG. 2 which operates by electrostatic attraction. For this purpose, the base 30a of image producing screen such as D or F described above has to be connected to source of electrical potential such as 38. The supporting member 40 must be very flat and may be of electrically conducting metal or may be in the form of a flat dielectric plate within which an electrically conducting layer is sandwiched. The conducting base 30a of image producing screen D or F and the support 40 are connected to the source of electrical potential such as of 1000 volt and when this circuit is closed before the exposure, the image producing screen will be attracted to form a good contact with support 40 and become uniformly flat. If the film 8 or screen D' is used, then one surface of it in order to be rendered electrically conducting may be provided with a thin layer of aluminum or copper by evaporation. Such electrically conducting layer may be detached before the developing of said films. This detachable electrically conducting layer and conducting layer of the first image producing screen are connected to the source of electrical potential 38 as was explained above, if voltage spark application is necessary. It should be understood that this construction to insure flatness may be used in all vacuum tubes described herein. It was found that a very good contact between the first and the second image producing screen described above is an essential feature in construction of these devices in which the second image producing screen is inert to light such as screen D or D', J or J' or their modifications. Although it is possible to mount the first and the second image producing screens in a spaced relationship and in close proximity to each other, results will be inferior as to definition of images and sensitivity.

It was furthermore found that in devices in which the second image producing screen is light sensitive, the first and second screen may be in some cases, spaced apart up to the distance not exceeding 100 microns.

It should be understood that in some applications compartment B may be modified by forming windows such as 66 and 67 on its endwall instead of on sidewalls. Also the supply of film 8 or 70 and their modifications may be held in the compartment B on a reel before the exposure to avoid continuous opening and closing of vacuum locks 17. Also the above films after their exposure may be held in the compartment B on a reel to avoid continuous opening and closing of vacuum locks 17. In some applications, compartment B may have only one window such as 66 instead of 2 windows. It should be understood that the above modifications of compartment B apply to all embodiments of the invention.

It should be understood that traveling film such as 8, 25, 35 and their modifications may be cooled before introduction into compartment B in order to prevent liberation of gasses.

It should be understood that in all modifications of this invention in which the image receiving and producing means are in the form of a stationary fluorescent screen mounted in the compartment B, the endwall of said compartment B may be of vacuum tube glass or it may be of fiberoptic construction for the whole or a part of the endwall.

It should be understood that this invention is applicable and useful also for vacuum tubes which use instead of the photocathode an electron gun. In such case, the photocathode 3 or its modifications will be replaced by an electron gun. One important application of this invention is therefore the standard electron microscope.

In some cases, the membrane 18 should be constructed of a supporting layer such as of aluminum oxide or silicon oxide which has on each of its major surfaces deposited an electrically conducting layer such as of aluminum or of silicon. One preferred method of constructing membrane 18 and all its modifications is to evaporate a layer of aluminum or silicon on a support of nitrocellulose and then to oxidize said layer to convert it into an oxide. Then, according to the application in which said membrane is used, another layer of aluminum or silicon may be evaporated on the layer of aluminum oxide or silicon oxide on one side thereof or on both sides.

The support of nitrocellulose will be destroyed by baking of the vacuum tube leaving a thin membrane 18 or its modifications.

It should be understood that the term membrane as used in specification and in the appended claims embraces all types of screens or layers.

It should be understood that the use of membrane 18 and all its modifications may apply to all embodiments of the invention. It should be also understood that the use of shutter 18 applies to all embodiments of the invention. It should be understood that the use of supporting means 18b or of baffles or guards 4a applies to all embodiments of the invention.

It should be understood that all vacuum tubes described above may be provided with windows or openings 66 and 67 in their walls, as described above.

It should be understood that the apparatus for feeding the film 8 or 25 or 35 or their modifications into a vacuum tube and the apparatus for receiving the above film transported to the outside of the vacuum tube, may be used in all embodiments of the invention or, alternatively, may be omitted.

It should be understood in all devices described above, the X-ray reactive photocathode 3 may be of composite screen type described above and illustrated in FIG. 1 or may be of a metal of high atomic number such as tungsten or lead or may be of a neutron-sensitive type as described in my U.S. Pat. No. 2,555,424.

It should be understood that in all devices described above, the use may be made of amplification of the electron beam either by means of another stage composite screen, or of a multichannel electron multiplier or of transmission type of electron multiplier such as silicon membrane of p-type. It should be understood that in all devices described above, the focusing means for electron beam may be of electrostatic type or of magnetic type or of proximity focusing type. It should be understood that an ion pump or titanium pump may be used in all embodiments of the invention for the best gettering action; for both compartments A and B.

It should be understood that dielectric material described above means a material which has electrical resistivity not less than $10^{12}$ ohm-cm. It should be understood that in all embodiments of the invention, said means for receiving electron beam and producing image may be formed of a sheet or tape and may be flexible, semi-flexible or non-flexible.

It should be understood that in all embodiments of this invention, shutter 19 may be preferably used between the photocathode and the first imaging screen. This will protect photocathode in case the first image producing screen has to be replaced.

It should be understood that if membrane 18 or its modifications is provided, it may be preferably coated with a thin over-layer on its one or both major surfaces such as of a heat resistant plastic such as silicones or polyamides or of evaporated glass or of aluminum oxide or silicon oxide. This will plug any pin-holes which may be present and will prevent leakage of ions or slow electrons through said membrane.

It should be understood that the protection of the photocathode may be also obtained by means of membrane 18 and its modifications either alone or in combination with the protection of the first image producing screen such as was described above. The membrane 18 or its modifications should be adjacent to said first image producing screen which means that it should be in contact with said screen or in close proximity to it. This is important because electrons of electron beam 7a are scattered by the passage through membrane 18.

It should be understood that the word pattern as used in this specification means image.

It should be understood that the wording latent image means image which has to be developed to become visible; the wording a screen inert to light means that such screen is not responsive to light in the way that photographic emulsion or photoconductive film are.

It should be understood that all screens whether of stationary or traveling type described above are reusable. It means that after the developing of the latent charge image or after the transfer of said charge image to another substrate, they may be used for new exposures.

It should be understood that in all embodiments of the invention in which film 30 or 30' of the second image forming screen receives electrical charges simultaneously with the exposure to imaging radiation, support member 40 may be omitted or may be retractable.

It should be understood that some applications, membrane 18 or its modifications may be eliminated if image producing screen of stationary type and which is affixed to walls of vacuum tube is present.

It should be understood that image producing screen which is stationary means that such screen is affixed to wall of vacuum tube directly or indirectly.

It should be understood that in all embodiments of the invention, proximity focusing may be preferably used.

It was found that the best definition of images of a large size such as ten inches was obtained by proximity focusing and it is understood that such focusing applies to all embodiments of the invention. Good results were also obtained with magnetic or electromagnetic focusing which is, however, very heavy and bulky.

It is understood that internal reflections of light within all vacuum tubes described herein are eliminated by blackening the inside surface of walls of said tubes and by depositing light absorbing material on the inside surface of said walls such as chromium oxide.

It is understood that field emission in all vacuum tubes described herein may be reduced by very good polishing and cleaning of all electrodes, by use of semiconducting coating on the inside surface of walls of said tubes and by processing photocathode externally to the tube which means before it is introduced into said tube. Furthermore, selection of photocathode with the lowest dark current such as K-Cs-Sb or Na-K-Sb is of value. In addition, cooling of the photocathode may be used for this purpose.

It should also be understood that the glass used for walls of said vacuum tube must be free of radioisotopes, especially of potassium. In some cases, the envelope of said tube should be preferably of stainless steel or of fused silica.

It should be understood that in all embodiments of the invention, the final electrographic image may be made on a transparent substrate or on light reflecting substrate. It should be understood that in all embodiments of the invention, the final electroradiograph may be made of either polarity, which means that black and white areas of electrograph may be reversed according to the need of application. It should be understood that in all embodiments of the invention, the final electrograph may be produced on the original film which was used in a vacuum tube or may be produced on another medium which serves as a transfer medium.

It should be understood that the particular embodiments and forms of this invention have been illustrated and it is understood that modifications may be made by those skilled in the art without departing from the scope and spirit of the foregoing disclosure.

What is claimed is:

1. A device comprising in combination a vacuum tube comprising photocathode means for receiving image produced by radiation and converting said radiation image into a beam of electrons having the pattern of said image, a first image producing composite screen, said screen receiving said beam of electrons and comprising an electrically conducting layer transmitting said electrons and a layer which in response to the impingement by said electron beam produces electron bombardment induced electrical conductivity changes having the pattern corresponding to said electron beam, and a second image producing screen, said first screen mounted within said tube, connected to at least one wall of said tube and being stationary in relation to said tube, at least one of said first and second screen having uniform electrical charges deposited on its surface, said conductivity changes in said first screen converting said uniform electrical charges into a pattern of electrical charges corresponding to said radiation image, and said second screen movable and adapted to travel into said vacuum tube and to travel away from said tube carrying said pattern of electrical charges thereon.

2. A device as defined in claim 1 in which said first screen is provided with means affixed to at least one wall of said tube and dividing said tube into two compartments separated from each other protecting thereby vacuum in the compartment in which said photocathode is mounted and preventing thereby damage to said photocathode.

3. A device as defined in claim 2, in which the boundary between said means affixed to the wall of said tube and said first screen is fortified by an additional layer of dielectric material.

4. A device as claimed in claim 1 in which said first screen comprises imperforate member of dielectric material.

5. A device as defined in claim 4 in which said electrically conducting layer transmitting said beam of electrons is in contact with said dielectric member.

6. A device as defined in claim 1 in which a member of dielectric material is mounted between said electrically conducting layer and said layer exhibiting electron bombardment induced electrical conductivity.

7. A device as defined in claim 1 in which said uniform electrical charges are deposited on the surface of said first screen.

8. A device as defined in claim 1 in which said uniform electrical charges are deposited on the surface of said second screen.

9. A device as defined in claim 1 in which said electron beam from said photocathode is focused on said first screen by proximity focusing.

* * * * *